June 5, 1956  T. W. WINSTEAD  2,749,294
METHOD OF MAKING MOLDS FOR THERMOPLASTICS
Filed Feb. 19, 1952  3 Sheets-Sheet 3

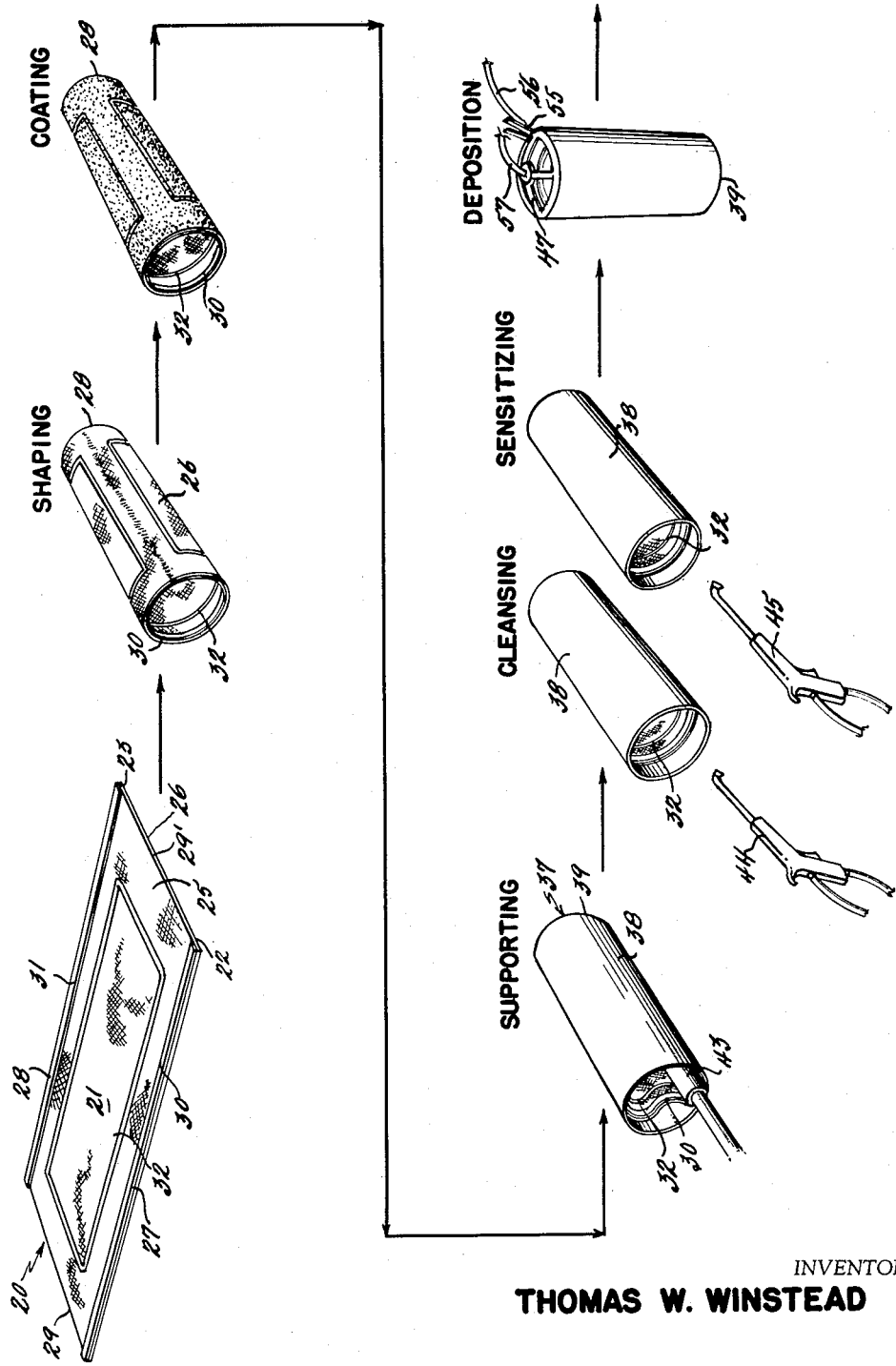

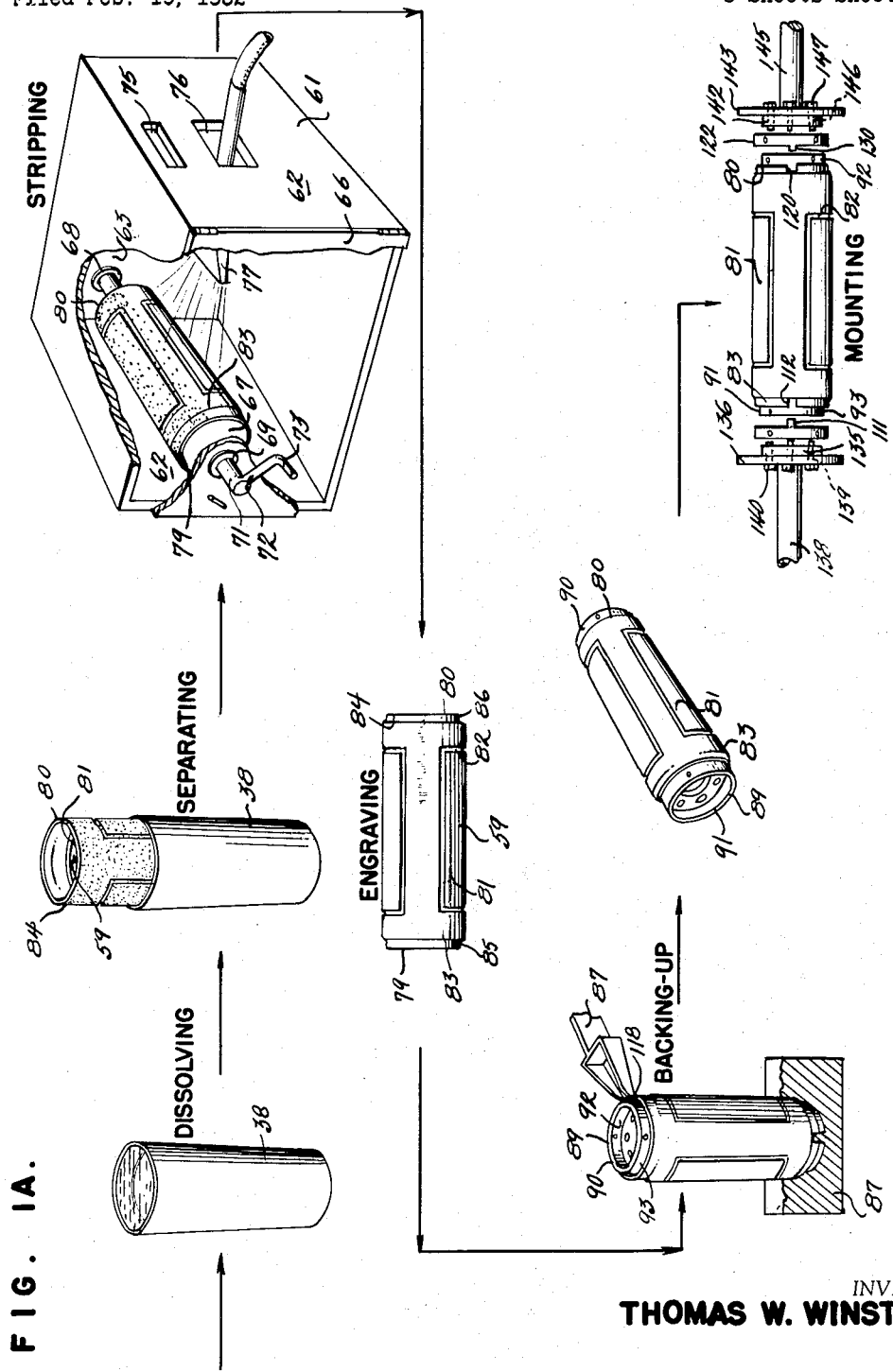

INVENTOR
THOMAS W. WINSTEAD

BY
ATTORNEYS

United States Patent Office 2,749,294
Patented June 5, 1956

2,749,294

METHOD OF MAKING MOLDS FOR THERMOPLASTICS

Thomas W. Winstead, Baltimore, Md., assignor to Hedwin Corporation, Baltimore, Md., a corporation of Maryland Application February 19, 1952, Serial No. 272,469

5 Claims. (Cl. 204—6)

This invention relates to methods of making molds and more particularly to methods of making molds for thermoplastics.

In the manufacture of thermoplastic sheets, it has been a practice in some instances to decorate said sheets by subjecting them to dies which impart to the sheet a decorative surface. It has been useful to subject said sheets to relatively high temperatures in order sufficiently to soften same to receive such decoration. Heretofore, when such embossing has been accomplished, the sheets have been subjected to embossing successively with a result that products of considerable attractiveness have been obtained but of somewhat variant quality and at relatively high unit cost. It is apparent that if such a decoration could be accomplished on a continuous basis, not only would the volume of production be markedly increased and the cost of production correspondingly decreased, but there would result an additional benefit in that the elements produced would be identical and of uniform standard.

Various molds have been utilized heretofore for producing thermoplastic items and, as shown by my pending U. S. patent application Serial No. 268,236, considerable effort has been directed toward deep embossing relatively thick thermoplastic sheets with designs having depth extending from less than ¼ inch to in excess of one inch, and successful steps have been directed toward manufacturing decorative plastic forms by deep embossing. In the practice of my invention pertaining to decorating with deep embossing, the greater depth has successfully been employed to yield production of excellent appearance and marketability. However, a substantial portion of the market for embossed plastics requires deep embossing with depths of less than ¼ inch. It will be apparent, however, that quality production of three-dimensional deep embossing on thermoplastics utilizing depth of less than ¼ inch requires regard for the detailed nature of the design embossed thereon, and major emphasis therefore is to be placed upon the fine detail of the deep embossed decoration.

It is a primary object of the invention to provide a method of making a mold suitable for the continuous deep embossing of thermoplastic sheets which will be expeditious, economical and efficient.

It is another object of my invention to provide a method of making molds for continuous production of thermoplastic material which will be comprehensive and reliable to produce a mold which will be highly accurate as a true reverse facsimile.

It is another object of this invention to provide a method of making a mold for deep embossing thermoplastics from a flat original which will be productive of an accurate and durable curved molding face for the production of flat objects.

It will be another object of the invention to provide a method of making molds which may be utilized for assembly-line production.

It is another object of the invention to provide a method of making molds which will be conveniently practicable through use of ordinary machine shop facilities.

It will be another object of the invention to provide a method of making a mold wherein several sequential steps of variant nature may be accomplished by one apparatus.

Additional objects and advantages of the invention will be understood by referring to the following detailed description including the drawings, wherein:

Figure 1 is a perspective view of a cloth original laid out in flat condition and successively advanced through a portion of the method;

Figure 1A is a continuation of Figure 1 and shows the subsequent sequential operations of the method;

Figure 2:
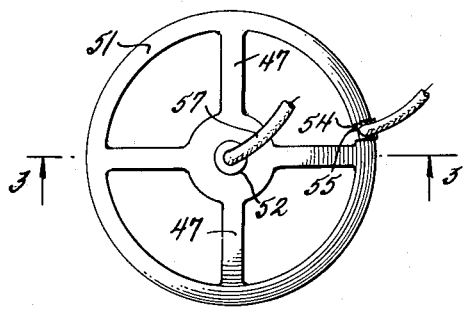
Figure 2 is a plan view of electroplating apparatus usable in the method.

In the preferred practice of the method, the method comprehends forming an original tubular shape and thereafter supporting, cleansing, sensitizing and electroplating thereon, including thereafter separating the original from the support and the original from the electroplate, backing up said electroplate to withstand high normal pressures and mounting said electroplate to complete the mold roll.

Referring particularly to the flow sheet of Figures 1 and 1A, an original 20 to be reproduced is treated to make a mold thereof for reproduction purposes. If it be supposed, for example, that original 20 is a linen cloth having table place mat area 21 and lateral waste areas 22 and 23, with face 25 of mat area 21 being best in appearance as customary with the upper surfaces of a cloth table mat, the undersurface 26 would be correspondingly negligible as to appearance.

Original 20 may be rectangular and having opposite edges 27 and 28 and opposed ends 29 and 29'. For the purpose of economizing thermoplastic material, wax shoulders 30 and 31 are placed respectively along edges 27 and 28 of the cloth face. By bringing ends 29 and 29' in butting relation in such a manner that the face 25 of original 20 constitutes the inner surface of a linen tube and reweaving the fabric, said ends are joined to form a seamless web. Undersurface 26 is external and may then be completely coated with any suitable adhesive such as rubber cement. This may be applied by any suitable brush means (not shown).

The cloth typified here by original area 20 will frequently have an ornament 32 in the face 25 which may be of any desired pattern comprising, for example, a rectangle of embroidery raised at some portions a maximum of 3/16" above the plane of face 25. Pressure reproduction of such contour in a thermoplastic mat is three-dimensional or so-called deep-embossing, in contradistinction to mere surface embossing.

The original tube is then placed concentrically within a round plastic receptacle 37 having side 38 and bottom 39, the juncture of bottom 39 with the side being rounded internally at 40 in order to facilitate cleansing. The plastic receptacle or tank 37 is provided with an upper rim 41, and the dimensions of the tank 37 are sufficient to permit the original tube to be cemented therewithin equidistant as to rim 41 and bottom 39 and caused smoothly to adhere to the internal wall by manual operation of a pressure roller 43. After the original tube has been pressed closely to adhere to the tank along its entire extent smoothly and without ripples or folds, the roller 43 may be removed and the original 20 supported on the tank interior is cleansed as by cleanser sprayer 44. Upon completion of its cleansing, the original tube is sprayed internally with an appropriate electroplating sensitizer of any desired nature such as silver nitrate or graphite. The interior of the tube is subjected to the sensitizing spray sufficiently to cause the inner surface in all interstices thereof to be completely covered with the sensitizer. Sensitizing may be as by spray 45.

Tank 37 is then provided with interfitting spider element 47 which supports anode 48 in its co-axial socket 49 between spaced radial arms 50—50, the spider having a circular rim 51 which fits snugly over tank rim 41. Socket 49 has an insulating bushing 52 for holding anode 48 to extend downwardly axially of the tank to within a short distance of bottom 39.

Figure 3:
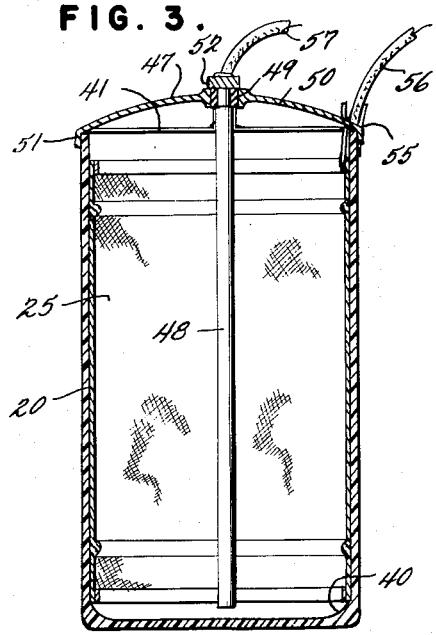
Figure 3 is a section taken on the line 3—3 of Figure 2.

By referring to Figures 2 and 3, it will be observed that the electroplating assembly includes the linen tube 20 lining the tank and having its sensitized face 25 or inner surface concentrically spaced from anode 48 throughout its entire length. Spider rim 51 is provided with an internal recess 54 through which passes insulated conductor clip 55 connecting lead 56 electrically to the sensitized inner surface of the linen tank lining. The electroplating circuit is completed through lead 57 fast to the upper end of anode 48.

The electroplating conditions may be readily determined from the desired characteristics of a resulting electroplate; in the present instance, if it be supposed that linen original is 20 inches long and 12 inches wide and plastic molding pressures to be applied normal to mold surface will be of the order of 1000 pounds per square inch, a cylindrical copper electrolytic deposit of constant, long-wearing quality and maximum density for desired thickness may be obtained by filling the tank with an electrolyte of conventional characteristics and subjecting same to appropriate direct current for a suitable time, stirring the electrolyte while maintaining its strength by known methods until the deposit is completed. For example, where the thermoplastic reproduction of original 20 is to be 20 inches long by 12 inches wide, the electrolyte may be $CuSO_4$ maintained at 100° F. and subjected to 3 volts current at 15–20 amp. per sq. foot for 48 hours. When necessary the electrolyte may be subjected to a moderate agitation as by stirring, in order to keep the deposit surface free from hydrogen bubbles.

Upon completion of electro-deposition the assembly on spider 47 and the electrolyte are removed and tank 37 filled with any solvent such as toluene and left to stand until the adhesive is destroyed. Thereupon original 20, and electroplate 59 are removed therefrom, in which condition they constitute a rigid composite tube consisting internally of the copper electroplate and externally of the original 20, the undersurface 26 of which is outermost. This rigid tube is then mounted in a closed vapor blast chamber 61, having opposite sides 62—62, a back 63 and a pivoted front section or door 66. A drum 67 is rotatably mounted on journals 68—69 so as to turn within the chamber 61, an external drive comprising an angular shaft extension 71 to receive a socket crank 72 having a handle 73. One side includes a viewing window 75 and an aperture 76 through which is let into chamber 64 a vapor-sheet blast nozzle 77. This apparatus is effective quickly to remove the linen original from the electroplate and is actuated, for example, by turning crank 72 to spin drum 67 while subjecting the linen surface to vapor-sheet blast from nozzle 77. It will be understood that nozzle 77 is so designed as to direct a highly controllable destructive blast continuously across the width of the linen surface, the force of the blast being constant from one side to the other so that the linen surface is removed evenly during rotation and the wax shoulders 30 and 31 are removed simultaneously to completely cleanse the outer surface of the electroplate, in which operation the destroyed textile material accumulates as debris in the blast chamber. Upon inspection, and as soon as the removal of the original is determined, the vapor blast is stopped and door 66 opened by removing socket crank 72.

The drum 67 is then cleared by removing the tubular electroplates 59 as a mold face characterized by opposite circular edges 79 and 80 and an intermediate peripheral face 81 constituting a high fidelity reverse relief facsimile of the upper surface of the linen original 20. Due to the exceptional accuracy of the electro-deposit obtained in this method, the electroplate 59 usually includes definite traces of the original re-weaving hence the electroplate is then dressed by an engraver who removes such re-weaving marks and substitutes therefor a touching-up which completes overall the reverse facsimile character of the exterior throughout the periphery of the tubular electroplate. The electroplate then includes the central face design area 81 having a groove 82 rectangular if projected, caused by the raised embroidery 32 of original 20. The electroplate also includes opposite outer areas 83 and 84 which are below the plane of design face 81 due to the wax shoulders 30 and 31, respectively. The outer areas define lateral peripheral shoulders 85 and 86 respectively which delimit the design area of the face 81. The outer surface of the electroplate being of the above essential quality, it will be understood that the interior surface thereof may remain as upon completion of the cleaning operation and without specific finish.

Thereafter the completed electroplate is placed upon one end 79 in a pouring holder or box 87 suitably recessed to embrace the electroplate as far as peripheral shoulder 85, the holder 87 being preferably internally recessed so to center concentrically with the electroplate a tubular core 89 having a wall 90 of considerable thickness rotatably to withstand relatively high molding pressures. The electroplate is preferably uniformly of greater internal diameter than core 89, the latter constituting not only a strong support for the electroplate but also a shaft for rotating the electro-deposited mold face.

Core 89 has one end 91 and an opposite end 92 spaced by outer surface 93 and inner surface 94. Its axial bore 96 is partially closed at one end by wall 97 having outward spaced recesses 98, six in number. Wall 97 has an axial bore 99 communicating with bore 96, and an outward annular recess 100 accommodating O-ring 101 concentric with peripheral outward flange 102 fixed by annular weld 104 within steel core 89. Core end 91 is surrounded by a steel band 105 preferably shrunk thereon and having spaced holes 106, 106 for radial fastening screws 107, 107 fast in holes 108, 108 in core wall 90. Band 105 is attached so that its outer edge 109 is flush with end 91, its inner edge 110 having a pair of diametrically disposed rectangular lugs 111, 111 which fit in corresponding recesses 112, 112 cut in the outer area 83 of the electroplate. At its opposite end core 89 is closed by end wall 113 concentric with end wall 97 and having outward spaced recesses 114, 114, preferably six in number, and an outward annular recess 115 concentric with outward flange 116 fixed by annular weld 117 within steel core 89.

For backing-up, electroplate 59 and tubular shaft 89 are supported in holder or pouring box 87 on vertical axes, per Figure 1A. It will be understood that a continuous space exists between the periphery of the shaft 89 and the inner surface of the electroplate. By supporting shaft 89 and electroplate 59 in the vertical relationship shown, the electroplate may simultaneously be backed-up and secured to its shaft by pouring molten lead therebetween, as at 118 in Figure 1A. When the electroplate has been filled to the brim with lead, the latter is permitted to cool and harden, being thereafter removed from pouring box 79, to disclose the next condition illustrated, comprising a sturdy circular mold with a design-bearing surface constituting a high fidelity reverse facsimile of the cloth original 20.

A pair of rectangular recesses 120, 120 are then cut diametrically in outer area 84 of the electroplate, and also through the lead backing. A band 122, corresponding to band 105, is then shrunk with a tight fit upon shaft end 92 and has holes 123, 123 for receiving screws 124, 124 fast in holes 126, 126 formed radially in core 89. Outer edge 127 of band 122 is flush with tube end 92, and its inner edge 128 includes diametrically disposed rectangular lugs 130, 130 which engage in the corresponding recesses 120, 120 in the copper and lead layers.

Figure 4:
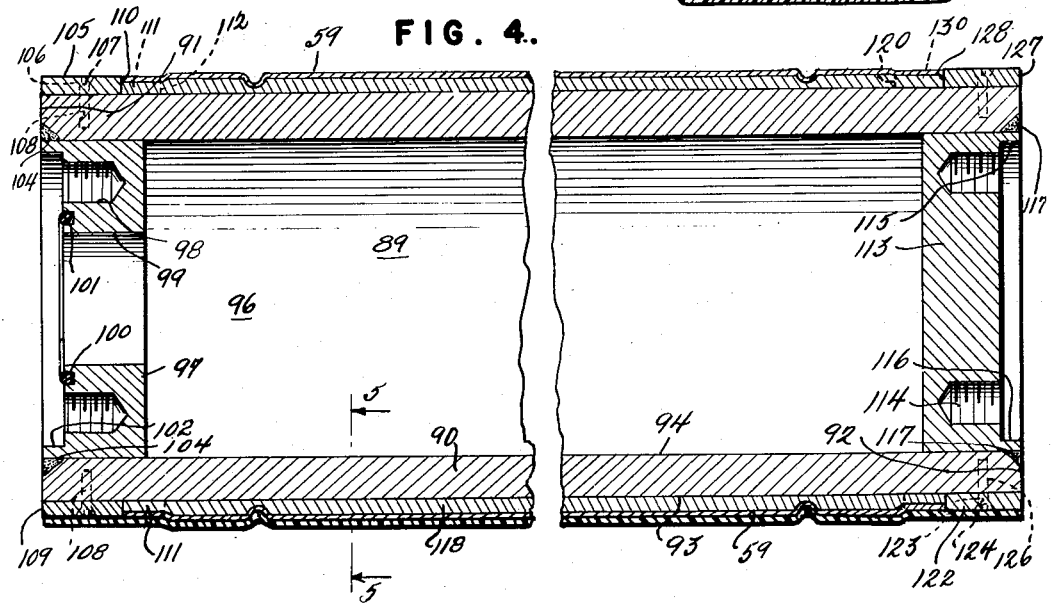
Figure 4 is an enlarged section, partly broken away, showing the mold product of the method.
Figure 5:
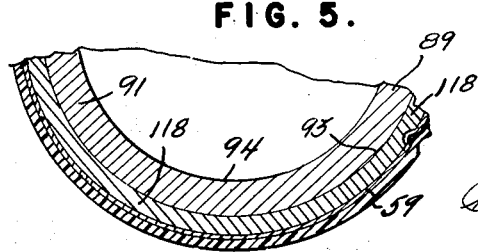
Figure 5 is an enlarged fragmentary section taken on the line 5—5 of Figure 4.

The mold having thus been backed-up concentrically on steel tube 89 and simultaneously rigidly secured thereto by lead alloy 118, it may be mounted for actuation by means of face disc 135 on coupling plate 136 fast to one end of hollow shaft 138, said shaft interiorly constituting a source of fluid temperature control for the mold, as providing hot or cold water supply for a U-siphon circuit therewithin (not shown). Externally hollow shaft 138 may be provided with suitable means (not shown) constituting a power drive to rotate the mold in continuous production. Coupling plate 136 is provided with holes 139, 139 for receiving bolts 140, 140 threading into wall recesses 98. By reference to Fig. 4 it will be apparent that when the bolts 140 are taken up and firmly secured in recesses 98, face disc 135 will seat sealingly within peripheral flange 102 and upon O ring 101, and coupling plate 136 will seat against end 91 of steel tube 89, projecting radially there-beyond to form work-defining flanges for the mold. Correspondingly, at the opposite end of the mold, face disc 142 on coupling plate 143 fast on shaft 145 rotatable in any fixed journal (not shown) may be attached securely to the mold, spaced holes 146, 146 being provided in coupling plate 143 to receive bolts 147, 147. When said bolts are tightened in wall recesses 114, 114, the face disc 142 will seat within flange 115, coupling plate 143 being fixed to end 92 and provide radially there-beyond a work-defining flange corresponding to opposite coupling plate 136.

From the foregoing, it will be observed that there has been provided a complete method whereby a textile or any flexible flat design original 20 may be made into a heavy duty and long-wear-resisting mold for the continuous production of high fidelity facsimilies corresponding to original 20. Despite the steady and highly efficient nature of the product of this method, it is additionally advantageous in that the method economically provides a high-fidelity reverse-facsimile molding surface for thermoplastics upon the rotary mold, the only machining operations required being the slight action at the engraving stage incident to the elimination of the irregular interweave mark and the substitution of continuous normal textile weave marks, and cutting the two pair of diametrical rectangular recesses in the edges of the mold to receive the locking lugs of band 122; both of these operations being practicable either by machine or manually.

Not only does shaping the flat cloth original 20 into tubular condition provide a suitable cathode for the production of a cylindrical electro-deposition thereon, but it immediately brings the material into appropriate initial shape so that thereafter the shape of original 20 need not be changed throughout the process, and also enables it to fit into a single design of container for each of the successive supporting, cleansing, sensitizing, deposition, dissolving and separating steps.

In securing the cylindrical textile body to be supported in tank 37, any suitable synthetic, or natural rubber-based adhesive may be used, such being thoroughly applied to the exterior of the textile tube at the coating step.

The action of the toluene frees the original 20 from the tank, and when the electro-deposit is mounted on drum 67 in the chamber 61, the vapor blast 77 not only effectually strips all of original 20 from the exterior of electro-deposit 59 but it also accomplishes a thorough cleansing and polishing action on the face details of the electro-deposit 59. This stripping and polishing is essentially simultaneous action and not only saves considerable time and labor expense in preparing the mold but also considerably reduces the "breaking in" time for thermoplastic molding.

The preferred method for sensitizing prior to electroplating would be by chemical silver reduction, a process well known in the mirror industry. However, other methods might be employed such as spraying or dusting with graphite, the basic purpose being to provide a very thin conductive metallic layer which in no way destroys the detail in the original because of its microscopic thickness.

While any suitable metal may be employed in the backing-up operation, preferably metal alloy such as that used in the electrotypers industry is used. The essential phase of the backing-up step is speed, economy of material and elimination of machining; by the described step the core and mold assembly are integrated to a rigid element and good contact between the electro-deposit 59 and the core 89 provides adequate heat exchange for either heating or cooling the mold by circulating fluid through the core.

The subsequent engraving step is normally desirable in that it is convenient to prepare the original 20 for tubular shape by butting the ends 29 and 29' and reweaving the joint. Expert reweaving will manifest itself by an immediate visible difference in weave and such reweaving mark will appear on the electro-deposit in accordance with the high fidelity nature of the method. Any experienced engraver will have no difficulty in removing such reweaving marks to the extent in which they are evident, and substituting therefor in the limited area of the reweaving marks accurate imitation weaving marks in simulation of normal weaving. When this is done the product of such thermoplastic mold will betray no sign of reweaving marks. Of course, the present method is conveniently adaptable to originals manufactured in tubular shape wherein the textile weaving is continuous, and no reweaving would be required. In such a case the intermediate engraving step would be eliminated.

I claim:

1. In the art of molding sheet-like thermoplastic replicas of relief surfaces of flat flexible elements, the method of making molds which includes providing a flat flexible design original having predetermined relief characteristics, forming said design original to a continuous woven tubular web with said relief characteristics inside the tube, cementing the tube externally to a surrounding support, cleansing the interior of the tube, treating the inner surface of the tube to render it electrically conductive, immersing the tube in an electrolytic bath with the inside of the tube exposed to the electrolyte, electro-depositing on all said inner surface a continuous intimate coating of hard metal, dissolving the cement, separating the tube from said support, and vapor blasting the external surface of the tube entirely to remove the continuous woven web having the relief characteristics to expose the electro-deposit.

2. Method of making a mold comprising forming a substantially flat design original to a continuous woven tubular web, externally supporting the tube, treating the interior surface of the tube to render it electrically conductive, immersing the tube in an electrolytic bath with the inside of the tube exposed to the electrolyte, electro-depositing a metallic coating on said interior surface, separating said design original from the coating to provide a metal cylinder having a peripheral reverse facsimile of said design original and simultaneously polishing said peripheral reverse facsimile to reduce "breaking in" time.

3. Method of making molds comprising forming a woven textile design original in flat flexible form, placing the ends thereof in abutting relationship and re-weaving the material to form a seamless woven tubular web with the design inside the tube, externally supporting the tube, treating the inside of the tube to render the surface thereof electrically conductive, immersing the tube in an electrolytic bath with the inside of the tube exposed to the electrolyte, and electro-depositing a metal lining on the interior of the tube so-formed.

4. Method of making molds as claimed in claim 3 and including vapor blasting the exterior of the tube entirely around the surface thereof to remove the woven textile forming the tubular web to expose the electro-deposit.

5. Method of making molds as claimed in claim 3, and including vapor blasting the exterior of the tube entirely around the surface thereof to remove the woven textile forming the tubular web to expose the electro-deposit, and engraving the electro-deposit to remove re-weaving marks and substitute normal textile weave marks.

References Cited in the file of this patent

UNITED STATES PATENTS

| | | |
|---|---|---|
| 72,601 | Noggerath | Dec. 24, 1867 |
| 675,413 | Robertson | June 4, 1901 |
| 680,520 | Edison | Aug. 13, 1901 |
| 777,642 | McIndoe | Dec. 13, 1904 |
| 889,341 | Shuman | June 2, 1908 |
| 1,151,317 | Wood | Aug. 24, 1915 |
| 1,208,808 | McIndoe et al. | Dec. 19, 1916 |
| 1,733,404 | Fahrenwald | Oct. 29, 1929 |
| 2,172,563 | Libberton | Sept. 12, 1939 |

FOREIGN PATENTS

| | | |
|---|---|---|
| 2,196 | Great Britain | of 1883 |
| 6,169 | Great Britain | of 1903 |

OTHER REFERENCES

Electrodeposition of Metals, by Langhein et al., 1924, pages 228–236.